(12) United States Patent
Ma et al.

(10) Patent No.: US 8,737,912 B2
(45) Date of Patent: May 27, 2014

(54) ENABLING DOWNLINK TRANSPARENT RELAY IN A WIRELESS COMMUNICATIONS NETWORK

(75) Inventors: Jianglei Ma, Kanata (CA); Hua Xu, Ottawa (CA); Hang Zhang, Nepean (CA); Peiying Zhu, Kanata (CA); Wen Tong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 433 days.

(21) Appl. No.: 13/058,708

(22) PCT Filed: Aug. 12, 2009

(86) PCT No.: PCT/CA2009/001117
§ 371 (c)(1),
(2), (4) Date: Apr. 26, 2011

(87) PCT Pub. No.: WO2010/017628
PCT Pub. Date: Feb. 18, 2010

(65) Prior Publication Data
US 2011/0306291 A1    Dec. 15, 2011

Related U.S. Application Data

(60) Provisional application No. 61/088,183, filed on Aug. 12, 2008.

(51) Int. Cl.
*H04B 7/14* (2006.01)
(52) U.S. Cl.
USPC .................................. 455/9; 455/16; 375/212
(58) Field of Classification Search
CPC ... H04B 7/2606; H04W 16/26; H04W 84/047
USPC ....................................................... 455/9, 7
See application file for complete search history.

(56) References Cited

U.S. PATENT DOCUMENTS 3,775,980 A * 12/1973 Spirdco ............................ 60/462
5,036,523 A *  7/1991 Briskman ...................... 375/141
(Continued)

FOREIGN PATENT DOCUMENTS

CN    101345568 A    1/2009
EP    1 806 945 A2    7/2007
(Continued)

OTHER PUBLICATIONS

R1-082327, Samsung, "Application of network coding in LTE-advanced relay", TSG-RAN1 Meeting #53bis, Warsaw, Poland, Jun. 2008.

(Continued)

*Primary Examiner* — Hai V Nguyen
(74) *Attorney, Agent, or Firm* — Fish & Richardson P.C.

(57) ABSTRACT

Methods and apparatus are described for enabling downlink transparent relay in a wireless communication network. In a wireless communications network, a base station and a mobile station may communicate with each other via a relay station, as needed. Transparent relay may allow for relay communication between a base station and a mobile station although the mobile station is unaware of the relay station. However, non-contiguous transmission of a relay station may lead to channel quality measurement and channel estimation degradation during downlink transparent relay. According to some aspects, a base station may schedule a mobile station to a transmission mode that utilizes dedicated pilot signals for downlink transparent relay, and a relay station may transmit data and dedicated pilot signals over the same channel resources as the base station. According to some aspects, the relay station may null common pilot signals transmitted by the base station.

20 Claims, 11 Drawing Sheets

(56) References Cited

U.S. PATENT DOCUMENTS

| | | | |
|---|---|---|---|
| 6,577,650 B1* | 6/2003 | Tate et al. | 370/509 |
| 7,218,891 B2* | 5/2007 | Periyalwar et al. | 455/13.1 |
| 7,463,673 B2* | 12/2008 | Fujii et al. | 375/211 |
| 7,826,541 B2* | 11/2010 | Fujii et al. | 375/260 |
| 7,853,202 B1* | 12/2010 | Visotsky et al. | 455/9 |
| 7,885,214 B2* | 2/2011 | Ahmadi et al. | 370/295 |
| 7,929,971 B2* | 4/2011 | Lucidarme et al. | 455/450 |
| 7,965,785 B2* | 6/2011 | Li et al. | 375/267 |
| 7,983,236 B2* | 7/2011 | Rinne et al. | 370/342 |
| 8,050,618 B2* | 11/2011 | Kwun et al. | 455/7 |
| 8,073,063 B2* | 12/2011 | Ma et al. | 375/260 |
| 8,218,470 B2* | 7/2012 | Taori et al. | 370/315 |
| 8,223,625 B2* | 7/2012 | Malladi et al. | 370/208 |
| 8,224,332 B2* | 7/2012 | Min et al. | 455/444 |
| 8,229,418 B2* | 7/2012 | Mori et al. | 455/424 |
| 8,243,600 B2* | 8/2012 | Zhu et al. | 370/232 |
| 8,259,659 B2* | 9/2012 | Luft et al. | 370/329 |
| 8,265,044 B2* | 9/2012 | Zhang et al. | 370/336 |
| 8,274,923 B2* | 9/2012 | Shen et al. | 370/315 |
| 8,285,234 B2* | 10/2012 | Ishii | 455/135 |
| 8,289,895 B2* | 10/2012 | Yu et al. | 370/315 |
| 8,315,225 B2* | 11/2012 | Xu et al. | 370/330 |
| 8,351,949 B2* | 1/2013 | Fu | 455/450 |
| 8,396,024 B2* | 3/2013 | Baum et al. | 370/328 |
| 8,417,255 B2* | 4/2013 | Dayal et al. | 455/452.2 |
| 8,422,393 B2* | 4/2013 | Roh et al. | 370/252 |
| 8,432,982 B2* | 4/2013 | Pi | 375/260 |
| 8,442,431 B2* | 5/2013 | Chen et al. | 455/11.1 |
| 8,462,743 B2* | 6/2013 | Kovacs et al. | 370/338 |
| 8,472,366 B2* | 6/2013 | Xu et al. | 370/315 |
| 8,542,625 B2* | 9/2013 | Lim et al. | 370/315 |
| 8,588,785 B2* | 11/2013 | Bao et al. | 455/438 |
| 8,605,687 B2* | 12/2013 | Barak et al. | 370/335 |
| 2003/0124976 A1* | 7/2003 | Tamaki et al. | 455/15 |
| 2003/0227946 A1* | 12/2003 | Schwarz et al. | 370/503 |
| 2005/0070285 A1* | 3/2005 | Goransson | 455/436 |
| 2005/0111405 A1* | 5/2005 | Kanterakis | 370/328 |
| 2005/0190821 A1* | 9/2005 | Fujii et al. | 375/211 |
| 2005/0190822 A1* | 9/2005 | Fujii et al. | 375/211 |
| 2006/0209970 A1* | 9/2006 | Kanterakis | 375/259 |
| 2006/0240830 A1* | 10/2006 | Ranta-aho et al. | 455/436 |
| 2007/0060050 A1* | 3/2007 | Lee et al. | 455/13.1 |
| 2007/0070942 A1* | 3/2007 | Harris et al. | 370/329 |
| 2007/0070944 A1* | 3/2007 | Rinne et al. | 370/329 |
| 2007/0153734 A1* | 7/2007 | Lee et al. | 370/312 |
| 2008/0025251 A1* | 1/2008 | Lee et al. | 370/328 |
| 2008/0108369 A1* | 5/2008 | Visotsky et al. | 455/455 |
| 2008/0227386 A1* | 9/2008 | Dayal et al. | 455/7 |
| 2008/0227461 A1* | 9/2008 | Dayal et al. | 455/452.2 |
| 2008/0247488 A1* | 10/2008 | Li et al. | 375/299 |
| 2008/0318520 A1* | 12/2008 | Kwun et al. | 455/7 |
| 2009/0010238 A1* | 1/2009 | Barak et al. | 370/342 |
| 2009/0047971 A1* | 2/2009 | Fu | 455/450 |
| 2009/0168718 A1* | 7/2009 | Wang et al. | 370/329 |
| 2009/0190516 A1* | 7/2009 | Fukuoka et al. | 370/312 |
| 2009/0190634 A1* | 7/2009 | Bauch et al. | 375/211 |
| 2009/0191882 A1* | 7/2009 | Kovacs et al. | 455/450 |
| 2009/0201861 A1* | 8/2009 | Kotecha | 370/329 |
| 2009/0233544 A1* | 9/2009 | Oyman et al. | 455/7 |
| 2009/0252077 A1* | 10/2009 | Khandekar et al. | 370/312 |
| 2009/0262678 A1* | 10/2009 | Oyman et al. | 370/315 |
| 2009/0290502 A1* | 11/2009 | Tinnakornsrisuphap et al. | 370/252 |
| 2010/0029262 A1* | 2/2010 | Wang et al. | 455/423 |
| 2010/0034158 A1* | 2/2010 | Meylan | 370/329 |
| 2010/0093354 A1* | 4/2010 | Agashe et al. | 455/436 |
| 2010/0099428 A1* | 4/2010 | Bhushan et al. | 455/452.1 |
| 2010/0220645 A1* | 9/2010 | Kwon et al. | 370/315 |
| 2010/0254295 A1* | 10/2010 | Ahn et al. | 370/312 |
| 2010/0265874 A1* | 10/2010 | Palanki et al. | 370/315 |
| 2010/0304666 A1* | 12/2010 | Hottinen et al. | 455/7 |
| 2010/0304667 A1* | 12/2010 | Chen et al. | 455/9 |
| 2010/0315989 A1* | 12/2010 | Reznik et al. | 370/315 |
| 2010/0323612 A1* | 12/2010 | Xu et al. | 455/7 |
| 2011/0002290 A1* | 1/2011 | Kim et al. | 370/329 |
| 2011/0013506 A1* | 1/2011 | Ishii et al. | 370/208 |
| 2011/0019605 A1* | 1/2011 | Ma et al. | 370/312 |
| 2011/0021230 A1* | 1/2011 | Moberg et al. | 455/507 |
| 2011/0038321 A1* | 2/2011 | Kim et al. | 370/328 |
| 2011/0065443 A1* | 3/2011 | Yellin et al. | 455/452.1 |
| 2011/0080865 A1* | 4/2011 | Tsai et al. | 370/315 |
| 2011/0103296 A1* | 5/2011 | Ji et al. | 370/315 |
| 2011/0170474 A1* | 7/2011 | Ji et al. | 370/315 |
| 2011/0176581 A1* | 7/2011 | Thomas et al. | 375/146 |
| 2011/0222428 A1* | 9/2011 | Charbit et al. | 370/252 |
| 2011/0306291 A1* | 12/2011 | Ma et al. | 455/9 |
| 2012/0015659 A1* | 1/2012 | Kalyani et al. | 455/436 |
| 2012/0020434 A1* | 1/2012 | Callard et al. | 375/296 |
| 2012/0040687 A1* | 2/2012 | Siomina et al. | 455/456.1 |
| 2012/0051248 A1* | 3/2012 | Roh et al. | 370/252 |
| 2012/0069919 A1* | 3/2012 | Clerckx et al. | 375/259 |
| 2012/0093061 A1* | 4/2012 | Charbit et al. | 370/315 |
| 2012/0114064 A1* | 5/2012 | Kotecha et al. | 375/295 |
| 2012/0163282 A1* | 6/2012 | Xu et al. | 370/315 |
| 2012/0314654 A1* | 12/2012 | Kotecha et al. | 370/328 |
| 2012/0320819 A1* | 12/2012 | Kim et al. | 370/315 |
| 2012/0329442 A1* | 12/2012 | Luft et al. | 455/418 |
| 2013/0010681 A1* | 1/2013 | Xu et al. | 370/315 |
| 2013/0012119 A1* | 1/2013 | Ma et al. | 455/9 |
| 2013/0016649 A1* | 1/2013 | Damnjanovic et al. | 370/315 |
| 2013/0016662 A1* | 1/2013 | Baligh et al. | 370/328 |
| 2013/0021932 A1* | 1/2013 | Damnjanovic et al. | 370/252 |
| 2013/0029677 A1* | 1/2013 | Baligh et al. | 455/450 |
| 2013/0176934 A1* | 7/2013 | Malladi et al. | 370/315 |
| 2013/0182583 A1* | 7/2013 | Siomina et al. | 370/252 |
| 2013/0336201 A1* | 12/2013 | Nishio et al. | 370/315 |
| 2014/0003326 A1* | 1/2014 | Nishio et al. | 370/315 |

FOREIGN PATENT DOCUMENTS

| | | |
|---|---|---|
| WO | 2008069555 | 6/2008 |
| WO | 2008/115827 | 9/2008 |

OTHER PUBLICATIONS

R1-082397, Panasonic, "Discussion on the various types of Relays", TSG-RAN1 Meeting #54, Warsaw, Poland, Jun. 2008.

R1-082470, Ericsson, "Self backhauling and lower layer relaying", TSG-RAN1 Meeting #53bis, Warsaw, Poland, Jun. 2008.

3rd Generation Partnership Project; Technical Specification Group Radio Access Network; Further Advancements for E-UTRA Physical Layer Aspects (Release 9), 3GPP TR 36.814, Version 1.2.01 (Jun. 2009).

3rd Generation Partnership Project; Technical Specification Group Services and System Aspects; Vocabulary for 3GPP Specifications (Release 8), 3GPP TR 21.905 V8.4.0 (Mar. 2008).

International Search Report for International Application No. PCT/CA2009/001117 (4 pages), Oct. 23, 2009.

Written Opinion of the International Searching Authority of International Application No. PCT/CA2009/001117 (5 pages), Oct. 23, 2009.

Nortel, "Some Further Considerations for Downlink Transparent Relay for LTE-A", TSG-RAN1 #54, Document No. R1-083158, Jeju, Korea, Aug. 18-22, 2008, pp. 1 to 10 [retrieved on Oct. 6, 2009 (May 10, 2009)]. Retrieved from the Internet at URL: http://www.3gpp.org/ftp/Specs/html-info/TDocExMtg--R1-54--26793.htm.

Nortel, "Transparent Relay for LTE-Advanced FDD", TSG-RAN1 #53 bis, document No. R1-082517, Warsaw, Poland, Jun. 30, 2008 to Jul. 4, 2008, pp. 1 to 8 [retrieved on Oct. 5, 2009 (May 10, 2009)]. Retrieved from the Internet at URL: http://www.3gpp.org/ftp/tsg_ran/WG1_RL1/TSGR1_53b/Docs/.

IEEE, "Standard for Local and metropolitan Area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1", IEEE Std 802.16e-2005—Feb. 28 2006 (864 pages).

IEEE, "Standard for Local and metropolitan Area networks Part 16: Air Interface for Broadband Wireless Access systems Amendment 1: Multihop Relay Specification", IEEE Std 802.16j-2009—Jun. 12 2009 (314 pages).

(56) References Cited

OTHER PUBLICATIONS

International Preliminary Report on Patentability of International Application No. PCT/CA2009/001117—Feb. 24, 2011—(2 pages).
Office Action issued in Japanese Application No. 2011-522357 on Oct. 21, 2013; 7 pages.
Office Action issued in Chinese Application No. 200980140299.8 on Mar. 27, 2013; 15 pages.

Nortel; "Channel Sounding Overhead Analysis" (R1-060656); TSG-RAN Working Group 1 Meeting #44; Denver, Colorado; Feb. 13-17, 2006; 9 pages.
Extended European Search Report issued in European Application No. 09806263.1 on May 29, 2013; 9 pages.
Office Action issued in Chinese Application No. 200980140299.8 on Dec. 30, 2013; 7 pages.

* cited by examiner

ENABLING DOWNLINK TRANSPARENT RELAY IN A WIRELESS COMMUNICATIONS NETWORK

CROSS REFERENCE TO RELATED APPLICATIONS

The present patent application claims the benefit of and is a National Phase Entry of International Application Number PCT/CA2009/001117 filed Aug. 12, 2009, and claims the benefit of U.S. Provisional Patent Application Ser. No. 61/088,183, filed on Aug. 12, 2008, the entire content of the foregoing applications are incorporated herein by reference.

FIELD OF THE INVENTION

This application relates to wireless communication techniques in general, and in particular to an apparatus and method for enabling downlink transparent relay in a wireless communications network.

BACKGROUND

In a wireless communications network, a base station and a mobile station may communicate with each other via a relay station, as needed. Relay stations are designed to extend the coverage of a wireless communication network by receiving and transmitting communications between the base station and cell edge mobile stations. For example, a relay station can receive signals transmitted from a base station, and then transmit those signals to a mobile station, thus, improving the Signal to Noise Ratio (SNR) of transmissions between the base station and the mobile station. A relay station and a base station may transmit the same data and pilot signals to a mobile station over the same channel resources. For example, as part of a Hybrid Automatic Repeat reQuest (HARQ) process, a relay station may be used to boost the SNR for a HARQ re-transmission to a cell edge mobile station.

Relay communication may be transparent or non-transparent. For transparent relay, a mobile station may be unaware of the presence of a relay station, and should continue to behave normally despite the introduction of the relay station. Transparent relay may be used in a wireless network without the need to introduce new signalling mechanisms or channels to enable relay functionality for a mobile station. Mobile stations that are not configured to utilize additional signalling mechanisms or channels to enable relay may be referred to herein as "legacy mobile stations". Therefore, transparent relay may be backwards compatible with legacy mobile stations. By contrast, non-transparent relay may use additional functionality, such as signalling mechanisms or channels, to enable relay communications with a mobile station. Therefore, non-transparent relay may not be backwards compatible with legacy mobile stations. Similarly, a radio communications standard that does not include features or mechanisms to implement transparent relay may be referred to herein as a legacy standard.

Long Term Evolution (LTE) is a mobile radio communications standard developed by the 3rd Generation Partnership Project (3GPP). LTE-Advanced (LTE-A) is an enhancement of the LTE standardization. Both transparent and non-transparent relay may be supported in a LTE-A system. The LTE-A standard may provide for backwards compatibility with non-advanced (legacy) LTE systems. Transparent relay may be applied to extend coverage for both legacy LTE mobile stations and LTE-A mobile stations. A number of transparent relay scenarios, where the introduction of relay is transparent to a mobile station, are described in R1-082517, Nortel, "Transparent relay for LTE-A FDD", TSG-RAN1 Meeting #53bis, Warsaw, Poland, June 2008, the entire content of which are incorporated herein by reference. Documents related to LTE and LTE-A are available at <http://www.3gpp.org/article/lte> and are incorporated herein by reference.

Some 3GPP TSG-RAN1 meeting documents related to relay in LTE-A, which may be relevant to aspects of the present invention, are: R1-082327, Samsung, "Application of network coding in LTE-advanced relay", TSG-RAN1 Meeting #53bis, Warsaw, Poland, June 2008; R1-082397, Panasonic, "Discussion on the various types of Relays", TSG-RAN1 Meeting #54, Warsaw, Poland, June 2008; and R1-082470, Ericsson, "Self backhauling and lower layer relaying", TSG-RAN1 Meeting #53bis, Warsaw, Poland, June 2008, the entire contents of each of these documents are incorporated by reference.

SUMMARY OF THE INVENTION

According to one aspect of the present invention, there is provided a relay method in a wireless communication system comprising: a relay station receiving data, dedicated pilot signals, and common pilot signals from a base station; the relay station nulling the common pilot signals; and the relay station transmitting the data and dedicated pilot signals to a mobile station.

According to another aspect of the present invention, there is provided an apparatus in a relay station comprising: a module for receiving data, dedicated pilot signals, and common pilot signals from a base station; a module for nulling the common pilot signals; and a module for transmitting the data and the dedicated pilot signals to a mobile station.

According to still another aspect of the present invention, there is provided a wireless relay based communications network comprising: a base station; a relay station; and a mobile station, wherein the relay station receives data, dedicated pilot signals, and common pilot signals from the base station, the relay station nulls the common pilot signals, and the base station and the relay station transmit the data and dedicated pilot signals to the mobile station over the same channel resources.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE INVENTION

Although the concepts of the present invention may be used in various communication systems, in some embodiments these concepts can be particularly applicable to the LTE standard, and in particular LTE-Advanced.

One specific example of a communication system that might be used to implement embodiments described herein is described with reference to FIGS. 1 to 7. An example of a downlink transparent relay process that may be implemented in a wireless communication system is described with reference to FIG. 8. Aspects and embodiments of a method and apparatus for enabling downlink transparent relay are described with reference to FIGS. 9 to 15.

The term "base station" can refer to any access point providing coverage to an area, such as a wireless station. Mobile stations are also commonly referred to as user equipment, mobile terminals, user terminals, subscriber terminals, and communication devices, for instance. The term "mobile station" can refer to any receiving device (stationary or mobile).

Figure 1:
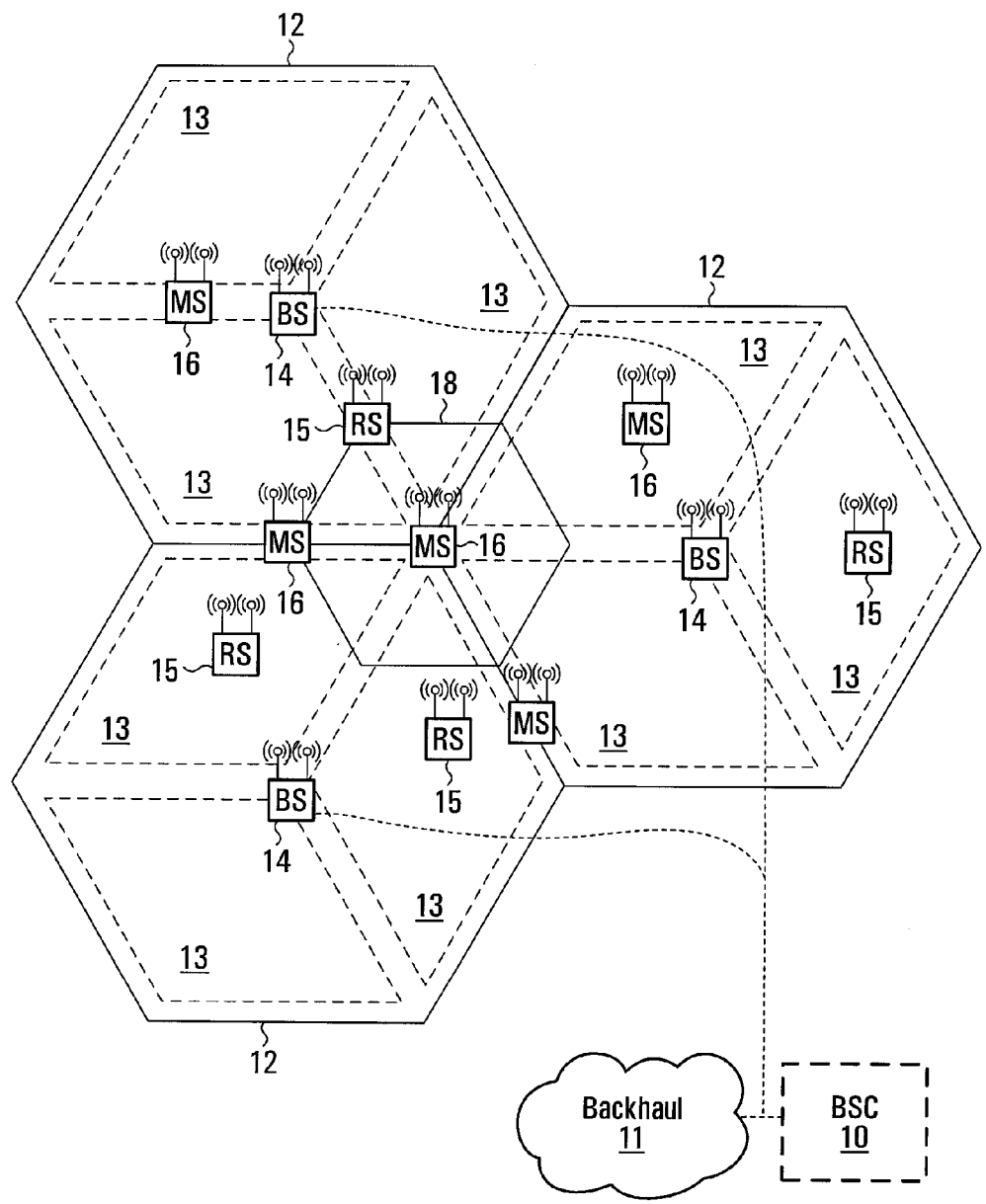
FIG. 1 is a block diagram of a cellular communication system.

FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each other and with another network (such as a core network or the internet, both not shown) over a backhaul network 11. In some configurations, a base station controller 10 is not needed.

Figure 2:
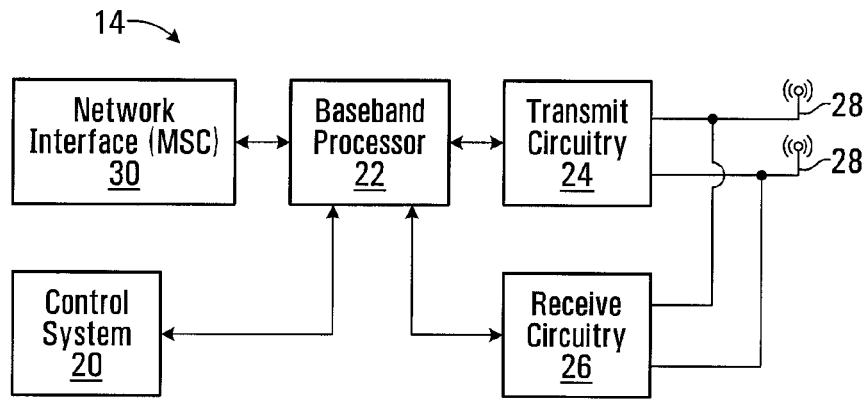
FIG. 2 is a block diagram of an example base station that might be used to implement some embodiments.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
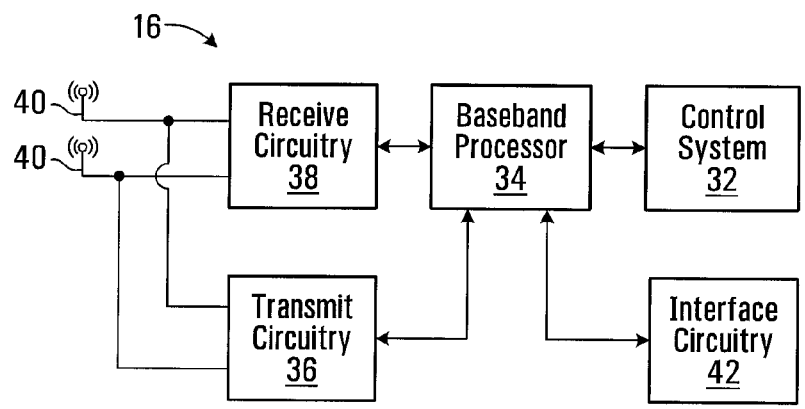
FIG. 3 is a block diagram of an example mobile station that might be used to implement some embodiments.

With reference to FIG. 3, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
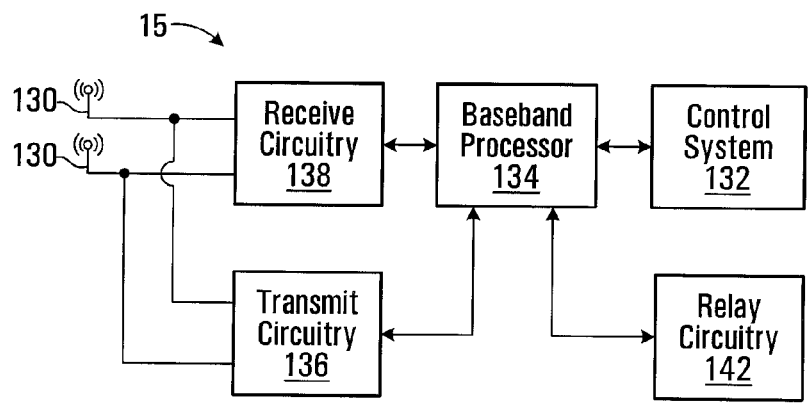
FIG. 4 is a block diagram of an example relay station that might be used to implement some embodiments.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
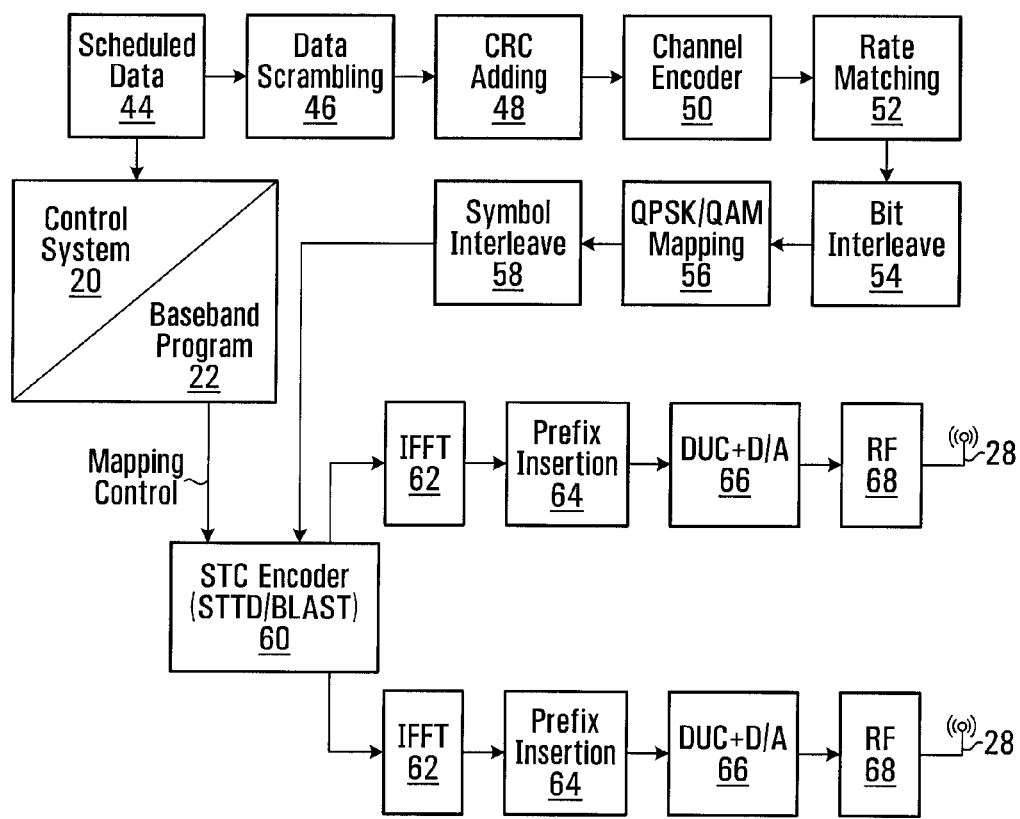
FIG. 5 is a block diagram of a logical breakdown of an example OFDM transmitter architecture that might be used to implement some embodiments.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals are up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
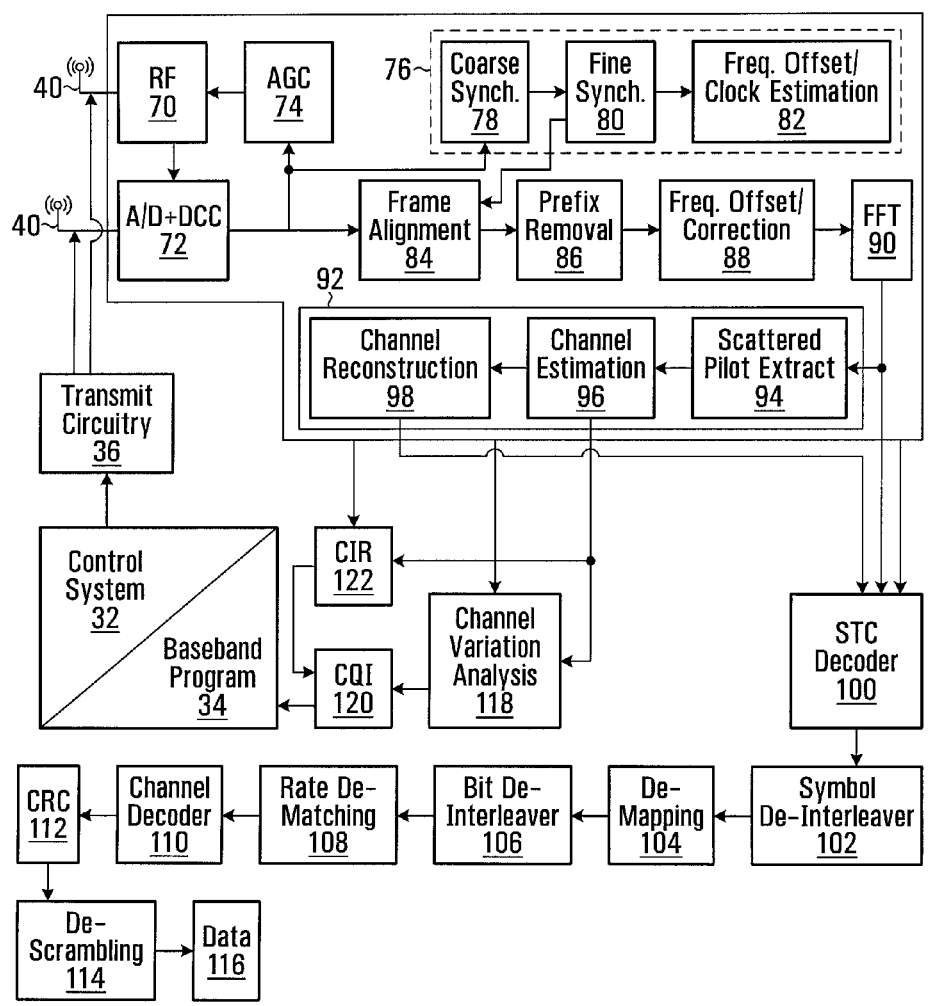
FIG. 6 is a block diagram of a logical breakdown of an example OFDM receiver architecture that might be used to implement some embodiments.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for descrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Figure 7A:
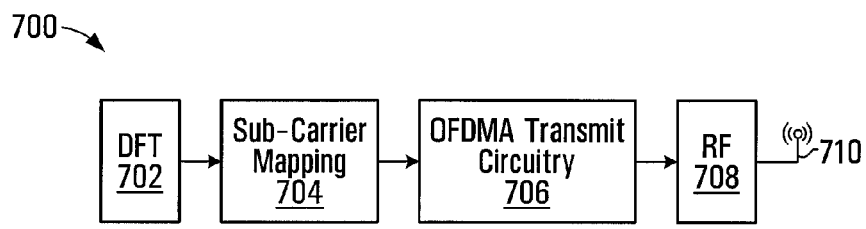
FIG. 7(a) is a block diagram of a logical breakdown of an example SC-FDMA transmitter that might be used to implement some embodiments.
Figure 7B:
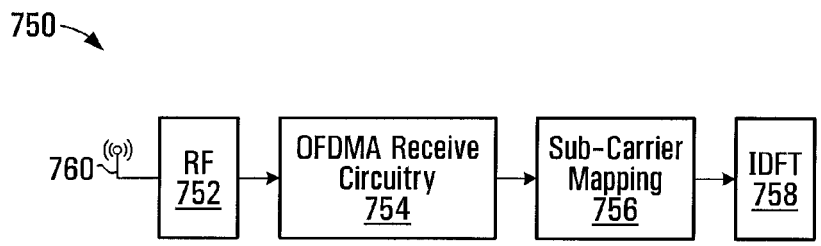
FIG. 7(b) is a block diagram of a logical breakdown of an example SC-FDMA receiver that might be used to implement some embodiments.

Referring to FIGS. 7(a) and 7(b), an example Single-Carrier Frequency Division Multiple Access (SC-FDMA) transmitter 700 and receiver 750 for Single-In Single-Out (SISO) configuration are illustrated provided in accordance with one embodiment of the present application. In SISO, mobile stations transmit on one antenna and base stations and/or relay stations receive on one antenna. FIGS. 7(a) and 7(b) illustrate the basic signal processing steps needed at the transmitter and receiver for the LTE SC-FDMA uplink. In some embodiments, SC-FDMA is used. SC-FDMA is a modulation and multiple access scheme introduced for the uplink of 3GPP LTE broadband wireless 4G air interface standards, and the like. SC-FDMA can be viewed as a DFT pre-coded OFDMA scheme, or, it can be viewed as a single carrier (SC) multiple access scheme. There are several similarities in the overall transceiver processing of SC-FDMA and OFDMA.

FIG. 7(a) shows SC-FDMA transmitter 700 including DFT logic 702, sub-carrier mapping logic 704, OFDMA transmit circuitry 706, RF circuitry 708, and transmit antennas 710. FIG. 7(b) shows SC-FDMA receiver 750 including IDFT logic 758, sub-carrier mapping logic 756, OFDMA receive circuitry 754, RF circuitry 752 and receive antennas 760. Those common aspects between OFDMA and SC-FDMA are illustrated in the OFDMA transmit circuitry 706 and OFDMA receive circuitry 758, as they would be obvious to a person having ordinary skill in the art in view of the present specification.

SC-FDMA is distinctly different from OFDMA because of the DFT pre-coding of the modulated symbols and the corresponding IDFT of the demodulated symbols. Because of this pre-coding, the SC-FDMA sub-carriers are not independently modulated as in the case of the OFDMA sub-carriers. As a result, the Peak-to-Average Power Ratio (PAPR) of SC-FDMA signal is lower than the PAPR of OFDMA signal. Lower PAPR greatly benefits the mobile stations in terms of transmit power efficiency.

FIGS. 1 to 7(b) provide one specific example of a wireless communication network that could be used to implement embodiments described herein. It is to be understood that embodiments described herein can be implemented with communications networks having architectures that are different than the specific example, but that operate in a manner consistent with the implementation of the embodiments as described herein.

For downlink transparent relay in a wireless communication network, a mobile station's behavior may be kept unchanged regardless of the introduction of a relay station. No special signalling may be required to alert the mobile station that relay is occurring. In addition, a relay station may not transmit and receive signals in the same band at the same time. The relay station receives signals from a base station and transmits signals to a mobile station. Since the mobile station may not receive and transmit the signals in the same band at the same time, the relay station may receive signals from the base station at one time and transmit the signals to the mobile station at another time. Therefore, a relay station's transmission to a mobile station may be non-contiguous.

Both data and pilot signals may be transmitted between a base station and a mobile station via a relay station. Pilot signals may be transmitted by a base station and used by a mobile station for, among other things, channel quality measurement and/or channel estimation. Channel quality measurements may be used for link adaptation. For example, the base station may determine a modulation and coding scheme for the mobile station based on the reported channel quality. Channel estimation may assist the mobile station decode a received transmission.

Pilot signals may be Multi-Media Broadcast Single Frequency Network (MBSFN), cell specific, or mobile station specific. MBSFN pilot signals may be transmitted by all base stations in a service area. Cell specific pilot signals, hereinafter referred to as "common pilot signals", are transmitted by a base station in a cell and may be used by all mobile stations in a cell. Common pilot signals may be continuously broadcast by the base station during the downlink in time, and may provide smooth channel variation in frequency. Mobile station specific pilot signals, hereinafter referred to as "dedicated pilot signals", are transmitted by a base station to a specific mobile station.

Figure 8:
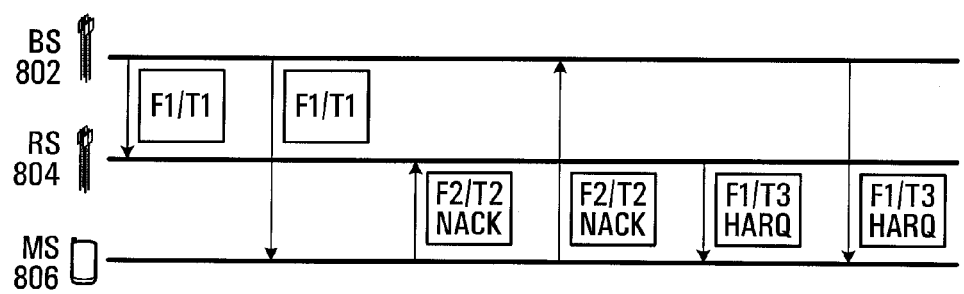
FIG. 8 is a diagram of an exemplary downlink transparent relay process.

FIG. 8 is a diagram illustrating an example of how downlink transparent relay may be implemented in a wireless communication system. The example illustrated in FIG. 8 shows downlink transparent relay as part of a Hybrid Automatic Repeat reQuest (HARQ) process and illustrates non-contiguous transmission by a relay station during downlink. HARQ performance is a method of error-control that may be used in a wireless system and may include re-transmission to a mobile station if an initial transmission was unsuccessful.

FIG. 8 shows a base station (BS) 802, relay station (RS) 804, and mobile station (MS) 806. The base station 802 transmits pilot signals on the Physical Downlink Control Channel (PDCCH) and data on the Physical Downlink Shared Channel (PDSCH) to relay station 804 and mobile station 806 over a first frequency at a first time (F1/T1). Relay station 804 listens to the PDCCH at F1/T1 and receives PDSCH at F1/T1. Base station 802 and relay station 804 listen for either an Acknowledge (ACK) or Negative Acknowledge (NACK) from a mobile station 806 over a second frequency at a second time (F2/T2). If a NACK is received, relay station 804 and base station 802 each transmit the correctly decoded data and pilot signals previously transmitted by base station 802, to the mobile station over the first frequency at a third time (F1/T3). Base station 802 and relay station 804 transmit the same data and pilot signals over the same channel resources F1/T3 as part of the HARQ re-transmission process.

Embodiments of the invention are not limited to the transparent relay example, or the HARQ process shown in FIG. 8. It is possible that a relay station may receive data and pilot signals from a base station in a separate transmission to the relay station only, rather than the relay station receiving signals from an initial transmission from the base station to the mobile station. A separate transmission to the relay station may require more backhaul communications.

Regardless of the process by which the relay station receives the data and pilot signals, the relay station and base station may subsequently transmit the data and pilot signals to the mobile station over the same channel resources, as shown in FIG. 8 at T3. The simultaneous co-transmission of the base station and relay station should be transparent to the mobile station. In transparent relay, the signal from the relay station to the mobile station may effectively be treated by the mobile station as an additional multi-path which may be combined with those from the base station.

As is shown in FIG. 8, a relay station may transmit non-contiguously to a mobile station. By contrast, a base station may transmit contiguously to the mobile station. Therefore, a mobile station, unaware of the presence of the relay station, may assume contiguous transmission and may perform "normal" unicast data de-coding in all non-MBSFN sub-frames. The non-contiguous transmission of data and pilot signals from a relay station to a mobile station may affect the accuracy of channel estimation and channel quality measurements made by a mobile station.

Channel quality measurement and channel estimation by a mobile station may normally be based on common pilot signals received in the downlink. A relay station may use common pilot signals for channel estimation and may normally transmit common pilot signals to the mobile station in order to allow channel estimation, by the mobile station, of the combined channel of the base station and the relay station. Therefore, channel quality measurements based on common pilot signals may vary depending on whether or not the relay station is transmitting to the mobile station. It may be desirable for channel quality measurements to be independent of whether a relay station is transmitting to the mobile station. However, during downlink transparent relay, the mobile station, unaware of the presence of the relay station, may measure channel quality based on common pilot signals during sub-frames in which the relay station is transmitting. Therefore, the channel quality measurement may be affected.

Furthermore, a mobile station may normally interpolate channel estimation between sub-frames. During downlink transparent relay, however, interpolation between sub-frames may not be desirable as the channel, as estimated by the mobile station, may depend on whether or not a relay station is transmitting. The combined channel at the mobile station (from the relay station to the mobile station and from the base station to the mobile station) may, therefore, vary from sub-frame to sub-frame due to the non-contiguous transmission of the relay station. Interpolating channel estimation between subframes where only the base station transmits to the mobile station and subframes where both the base station and relay station transmit to the mobile station may lead to poor interpolation. However, because a mobile station may not be aware that relay communication is occurring, channel estimation interpolation may be performed during downlink transparent relay, thus degrading channel estimation performance.

Thus, it may be desirable to provide a method of downlink transparent relay that may avoid channel quality measurement and channel estimation degradation that may occur due to non-contiguous transmission of a relay station to a mobile station during downlink transparent relay.

It may be desirable distinguish the transmission time slots with and without downlink relay station transmission. However, in legacy radio communications standards there may be no signalling channel or mechanism to indicate sub-frames in which a relay station is transmitting data to a mobile station.

Aspects and embodiments of a method and apparatus for downlink transparent relay will now be described with reference to FIGS. 9 to 15.

Figure 9:
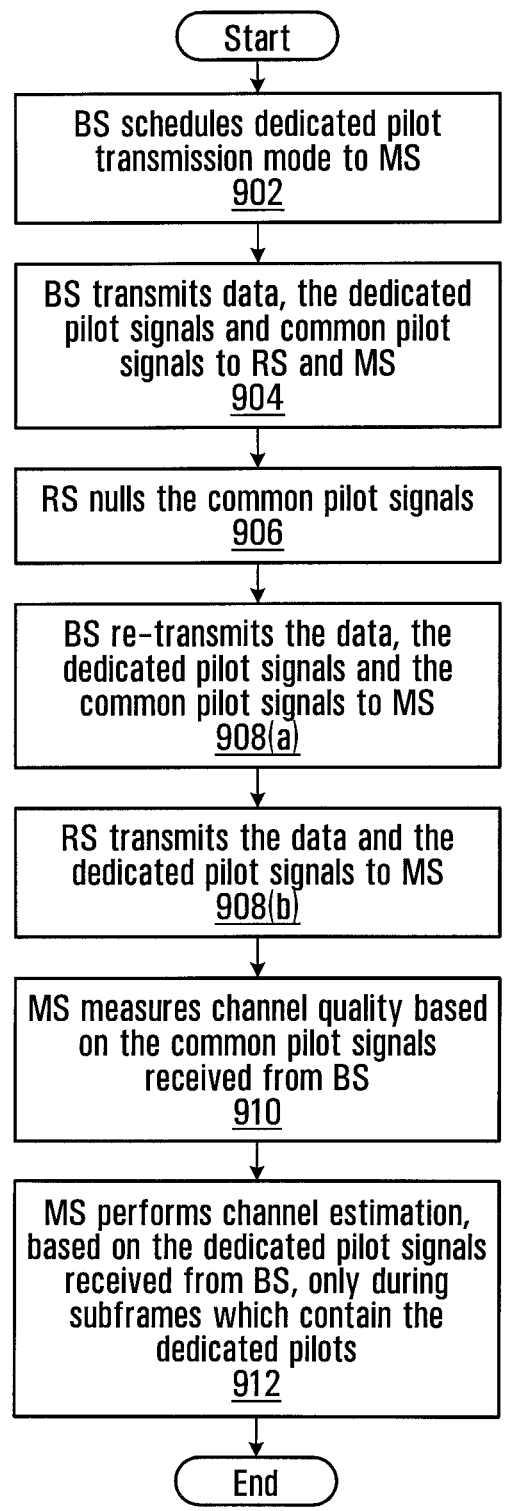
FIG. 9 is a flowchart of steps showing the steps for enabling relay in a wireless communication system in accordance with some aspects.

FIG. 9 is a flowchart showing steps for relay in a wireless communication system according to some aspects. It is not essential to aspects of the invention that all steps shown in FIG. 9 be performed, and certain aspects may comprise fewer steps than those shown. At step 902, a base station schedules a transmission mode to a mobile station, the transmission mode utilizing dedicated pilot signals. The base station may schedule the mobile station to the dedicated pilot transmission mode before, or at the outset of downlink transparent relay. At step 904, the base station transmits data, the dedicated pilot signals and common pilot signals to a relay station and the mobile station. Step 904 may be performed as part of a HARQ process, as shown in FIG. 8 at T1. However, aspects of the invention are not limited to a HARQ process, and it is also possible that the relay station may receive data and pilot signals from the base station in a separate transmission to the relay station only.

At step 906, the relay station nulls the common pilot signals. Steps 908(*a*) and 908(*b*) may be performed simultaneously. At step 908(*a*), the base station re-transmits the data, the dedicated pilot signals and the common pilot signals to the mobile station. At step 908(*b*), the relay station transmits the data and the dedicated pilot signals to the mobile station. The base station and relay station may transmit the data and dedicated pilot signals to the mobile station over the same channel resources. Channel resources may include both time and frequency resources, such that the relay station and the base station transmit to the mobile station at the same time and over the same frequency. At least steps 908(*a*) and 908(*b*) may be performed as part of a HARQ re-transmission in downlink transparent relay as shown in FIG. 8 at T3, although aspects of the invention are not limited to a HARQ process.

At step 910, the mobile station measures channel quality based on the common pilot signals received from the base station. Because the relay station does not transmit the common pilot signals to the mobile station, the common pilot signals received by the mobile station may have been transmitted by the base station only. Therefore, the channel quality as measured at the mobile station may be independent of whether or not the relay station is transmitting, and, therefore, channel quality measurement degradation may be avoided.

At step 912, the mobile station performs channel estimation based on the dedicated pilot signals received from the base station and the relay station, and only performs channel estimation during subframes which contain the dedicated pilots. When scheduled to a dedicated pilot transmission mode, the mobile station may only perform channel estimation based on the dedicated pilot signals. The dedicated pilot signals will be self-constrained in each sub-frame of transmission to the mobile station. In addition, a mobile station may not interpolate between different sub-frames when scheduled to a dedicated pilot transmission mode. Therefore, by scheduling a dedicated pilot transmission mode to a mobile station, during relay downlink, the mobile station may only perform channel estimation during sub-frames which contain dedicated pilot signals, thereby possibly avoiding channel estimation degradation.

As noted above, downlink transparent relay may be implemented in a LTE communications network. In LTE networks, an access point providing coverage may be referred to as a base node (NodeB) or evolved base node (eNB) rather than a base station; a mobile station may be referred to as user equipment (UE); a relay station may be referred to as a relay node (NodeR); and reference signals may perform the same functions as pilot signals. As will be appreciated by a person skilled in the art, references to a base station, relay station, mobile station and pilot signals herein may also refer to a base node, a relay node, user equipment, and reference signals respectively in a LTE communications network. However, embodiments of the invention are not limited to LTE communications networks and may be implemented in wireless communications networks configured to operate using other standards.

Some embodiments may be used in association with enhancements to LTE Release 8 standards, including LTE-Advanced. According to LTE Release 8 specifications, the following transmission modes may be semi-statically configured to each mobile station via higher level signalling:

1. Single-antenna port; port 0;
2. Transmit diversity;
3. Open-loop spatial multiplexing;
4. Closed-loop spatial multiplexing;
5. Multi-user MIMO;
6. Closed-loop Rank-1 pre-coding; and
7. Single-antenna port; port 5.

In the above modes, the term "port" may refer to specific physical antennas, or, in the case of "port 5" may refer to multiple antennas used for beamforming. Normally, the selection of transmission mode may be determined by antenna configuration of the base station and mobile station, channel conditions, transmission speed, traffic type and so on. Modes 1 to 6 utilize common pilot signals in the downlink. However, Mode 7 utilizes dedicated pilot signals.

According to some aspects, for downlink transparent relay, a base station can schedule LTE transmission Mode 7, regardless of antenna configuration or any other channel conditions, to a mobile station for which transparent relay communication will occur. Since dedicated pilot signals are mobile station specific, mobile stations that are in non-relay communication with a base station may be assigned to any one of the seven LTE Release 8 transmission modes shown above based on the usual criteria (i.e. antenna configuration of the base station and mobile station, channel conditions, transmission speed, traffic type and so on).

According to some aspects, a base station and a relay station apply a pre-coding matrix for beamforming to both data scheduled to a mobile station and to dedicated pilot signals. The relay station transmits the pre-coded data and dedicated pilot signals over the same channel resources as the base station. The relay station may use the same or similar pre-coding matrix used by the base station. The pre-coding by the relay station may be transparent to the mobile station. The mobile station will then decode the scheduled data with the help of the dedicated pilot signals.

Figure 10:
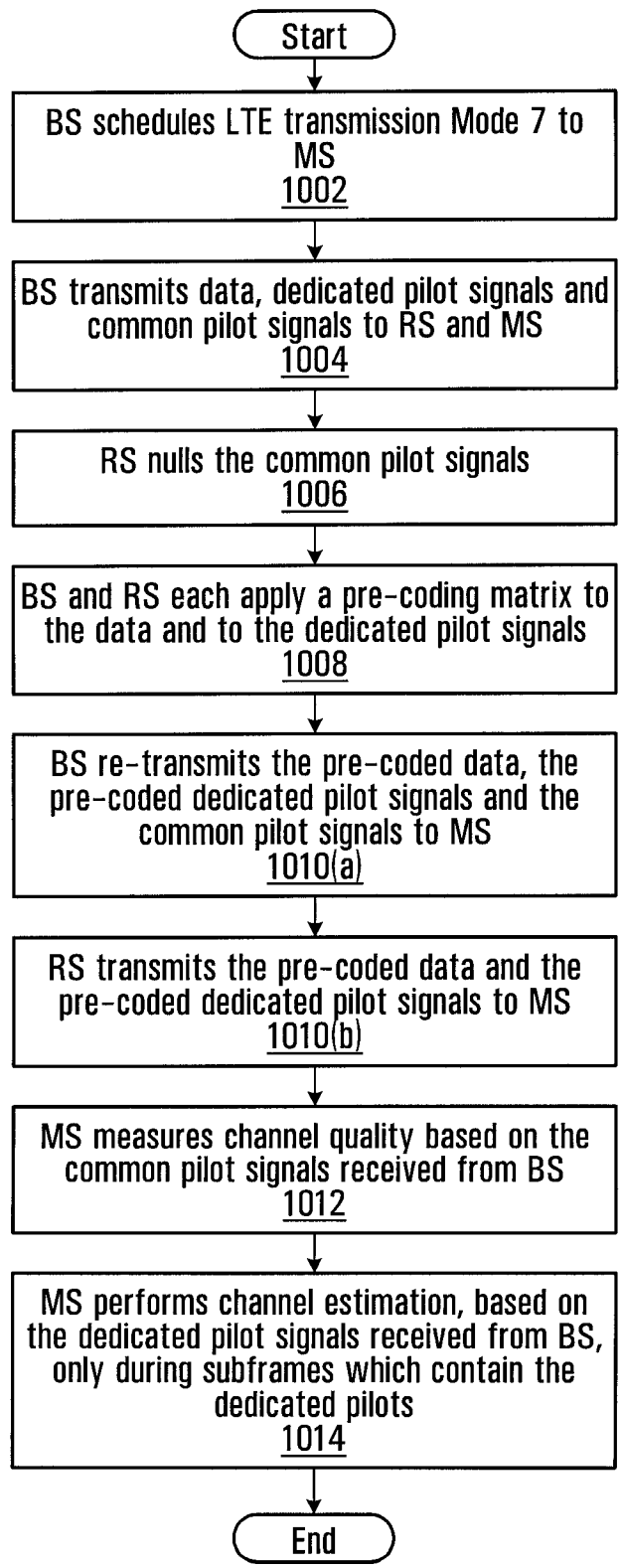
FIG. 10 is a flowchart of steps showing the steps for enabling relay in a wireless communication system in accordance with some aspects.

FIG. 10 is a flowchart showing steps for relay in a wireless communication system according to some aspects. It is not essential to aspects of the invention that all steps shown in FIG. 10 be performed, and certain aspects may comprise fewer steps than those shown. At step 1002, a base station schedules a dedicated pilot transmission mode, such as LTE transmission Mode 7, to a mobile station. The base station may schedule the mobile station to the dedicated pilot transmission mode before, or at the outset of downlink transparent relay communications. At step 1004, the base station transmits data, the dedicated pilot signals and common pilot signals to a relay station and the mobile station. Step 1004 may be performed as part of a HARQ process, as shown in FIG. 8 at T1. However, aspects of the invention are not limited to a HARQ process, and it is also possible that the relay station may receive data and pilot signals from the base station in a separate transmission to the relay station only.

At step 1006, the relay station nulls the common pilot signals. At step 1008, the base station and the relay station each apply a pre-coding matrix to the data and to the dedicated pilot signals. The relay station may apply the same or similar pre-coding matrix as the base station, although in some scenarios, the pre-coding matrix used by the relay station could be different from the pre-coding matrix used by the base station. Steps 1010(a) and 1010(b) may be performed simultaneously. At step 1010(a), the base station re-transmits the pre-coded data, the pre-coded dedicated pilot signals and the common pilot signals to the mobile station. At step 1010(b), the relay station transmits the pre-coded data and the pre-coded dedicated pilot signals to the mobile station. The base station and relay station may transmit the data and dedicated pilot signals over the same channel resources as the base station. At least steps 1010(a) and 1010(b) may be performed as part of a HARQ re-transmission in downlink transparent relay, as shown in FIG. 8 at T3, although aspects of the invention are not limited to a HARQ process.

At step 1012, the mobile station measures channel quality based on the common pilot signals received from the base station. At step 1014, the mobile station performs channel estimation based on the dedicated pilot signals received from the base station and the relay station and only performs channel estimation during subframes which contain the dedicated pilots. If the same pre-coding matrix is used by the base station and the relay station, the pre-coding processing applied by the base station may be transparent to the mobile station when dedicated pilot signals are used.

To improve HARQ performance, according to some embodiments, the pre-coding matrix used by the base station and relay station transmission may alternate between various different pre-coding matrices for different HARQ re-transmissions. This alternating behavior may be referred to as pre-coding hopping. Pre-coding hopping may be applied to different re-transmissions and a hopping pattern may be pre-defined.

In some embodiments, dedicated pilot signals and the common pilot signals may not interfere with one another. Available channel time and frequency resources may be divided into resource blocks, which may be further divided into resource elements. According to some aspects, to avoid interference, the dedicated pilot signals should not be transmitted over resource elements occupied by the common pilot signals transmitted by the base station.

FIGS. 11 to 14 illustrate examples of LTE resource block structures for downlink transparent relay communications for both a base station and a relay station. The LTE resource blocks in FIGS. 11 to 14 illustrate examples of how resource blocks might be structured to avoid interference between common and dedicated pilot signals. As will be appreciated by a person skilled in the art, common reference signals and dedicated reference signals may perform the same functions as common pilots and dedicated pilots respectively as described herein.

Figure 11:
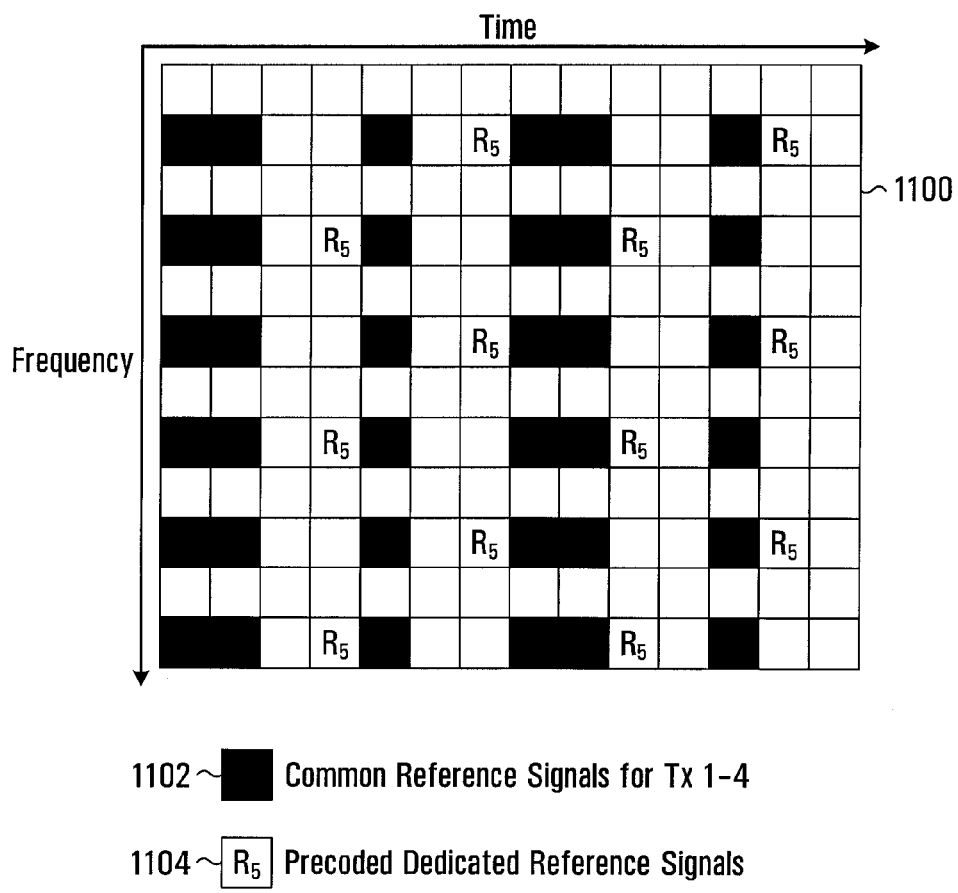
FIG. 11 is a diagram of an exemplary LTE resource block structure for a base station which may be used for downlink relay transmissions to a mobile station according to some aspects.

FIG. 11 is a diagram of an exemplary LTE resource block structure for a base station which may be used for downlink relay transmissions from a base station to a mobile station according to some aspects. FIG. 11 shows resource block 1100 which is composed of time and frequency resources separated into resource elements. The base station transmits common reference signals over resource elements 1102, as indicated by the legend in FIG. 11, using up to four physical antennas. The base station transmits dedicated reference signals for the mobile station over resource elements 1104, as indicated by the legend in FIG. 11. The dedicated reference signals resource elements 1104 are designated by the character "$R_5$" to indicate the port 5 transmission of LTE Transmission Mode 7 as described herein. As can be seen in the example of FIG. 11, the common and dedicated reference signals are transmitted in different resource elements.

Figure 12:
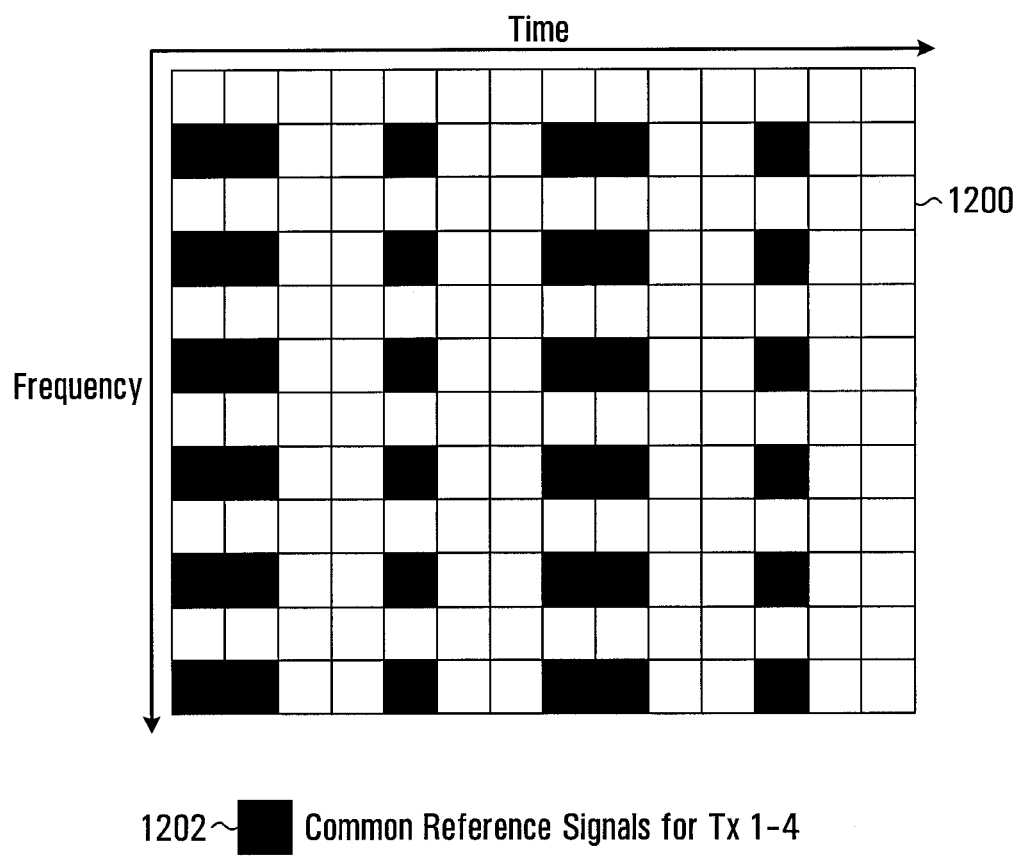
FIG. 12 is a diagram of an exemplary LTE resource block structure for a base station which may be used for downlink non-relay transmissions to a mobile station according to some aspects.

FIG. 12 is a diagram of an exemplary LTE resource block structure for a base station which may be used for downlink non-relay transmissions from a base station to a mobile station according to some aspects. FIG. 12 shows resource block 1200 which is composed of time and frequency resources separated into resource elements. The base station transmits common reference signals over resource elements 1202, as indicated by the legend in FIG. 12, using up to four physical antennas. There are no resource elements designated for transmitting dedicated reference signals in resource block 1200 as non-relay mobile stations are not scheduled to the dedicated reference signals transmission mode in FIG. 12.

Figure 13:
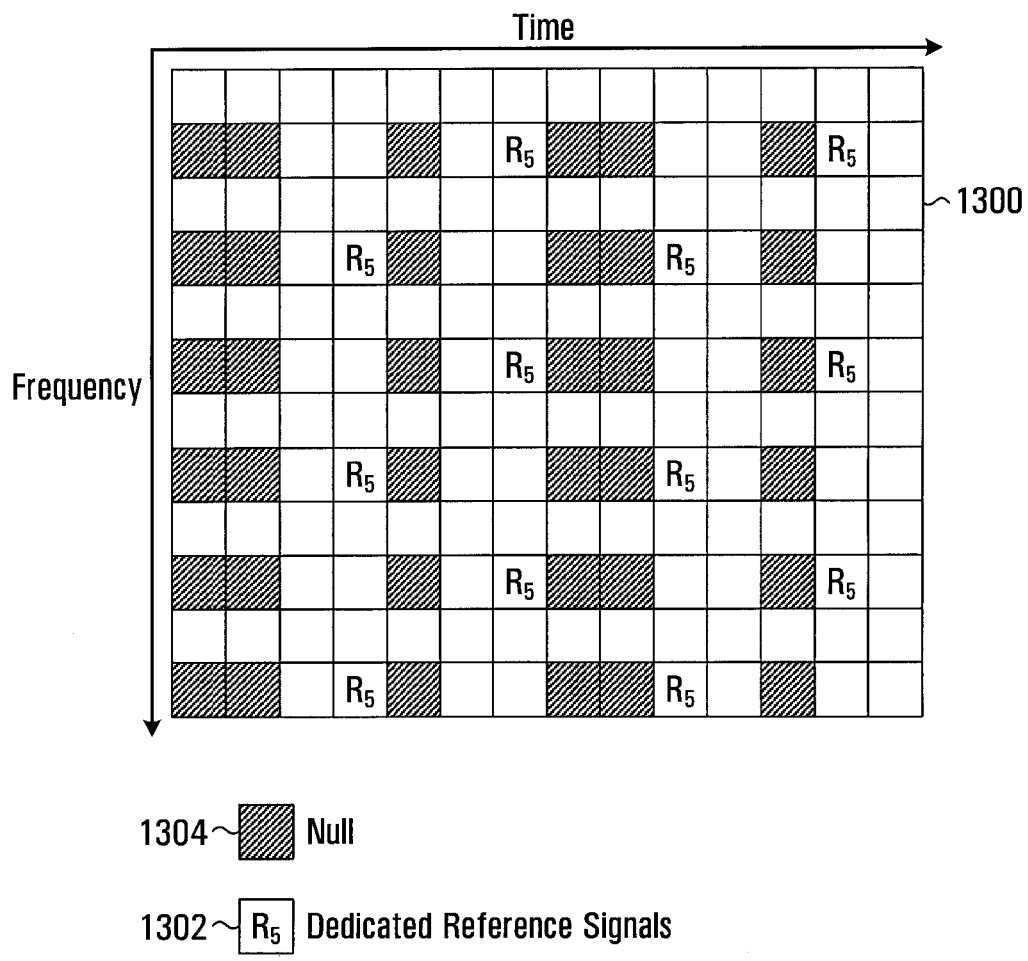
FIG. 13 is a diagram of an exemplary LTE resource block structure for a relay station which may be used for downlink relay transmissions to a mobile station according to some aspects.

FIG. 13 is a diagram of an exemplary LTE resource block structure for a relay station which may be used for downlink relay transmissions from a relay station to a mobile station according to some aspects. FIG. 13 shows resource block 1300 which is composed of time and frequency resources separated into resource elements. The relay station transmits dedicated reference signals over resource elements 1302, as indicated by the legend in FIG. 13. The dedicated reference signals resource elements 1104 are designated by the character "R₅" to indicate the port 5 transmission of LTE Transmission Mode 7 as described herein. There are no resource elements for transmitting common reference signals in resource block 1300 reference signals the relay station nulls resource elements which are used for transmitting common reference signals by the base station.

Figure 14:
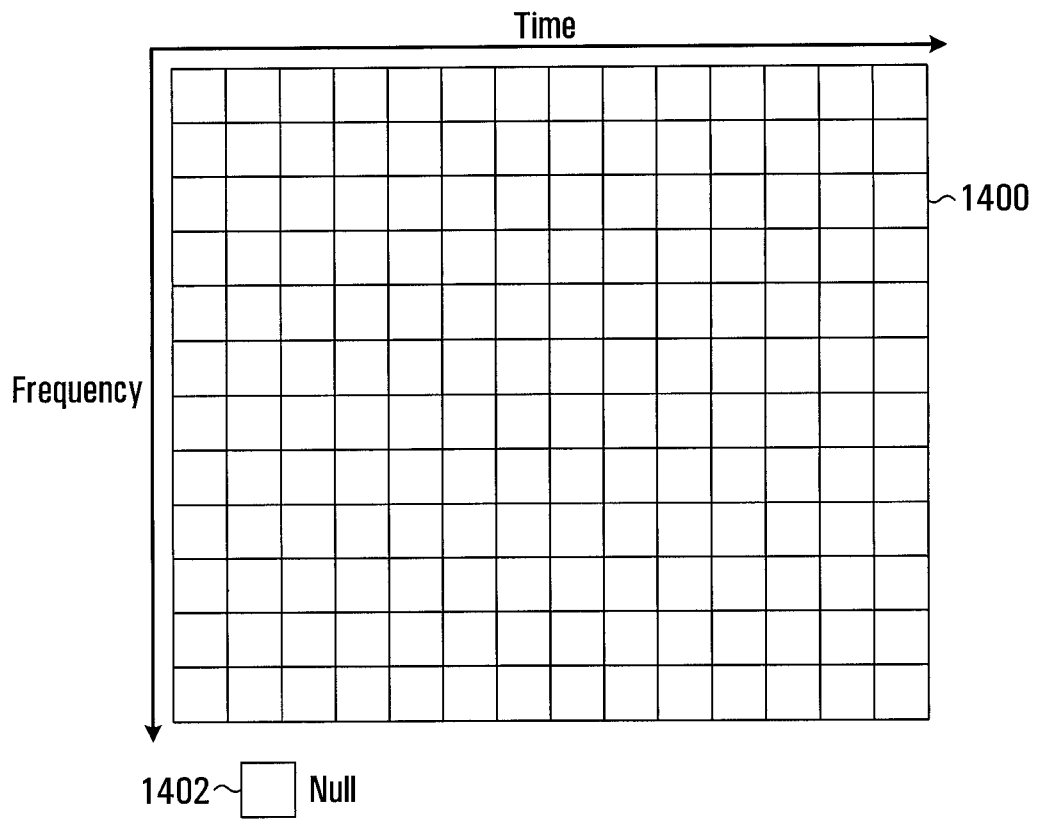
FIG. 14 is a diagram of an exemplary LTE resource block structure for a relay station which may be used for downlink non-relay transmissions to a mobile station according to some aspects.

FIG. 14 is a diagram of an exemplary LTE resource block structure for a relay station which may be used for downlink non-relay communications according to some aspects. FIG. 14 shows resource block 1400 which is composed of time and frequency resources separated into resource elements. No relay transmissions to a mobile station occur in the example of FIG. 14. Therefore, all resource elements 1402 as indicated by the legend in FIG. 14, are nulled by the relay station.

Since common reference signals and dedicated reference signals may be transmitted in different resource elements, as shown in FIGS. 11 to 14, the transmission of dedicated reference signals from the base station and the relay station may have no impact on the common reference signals which are transmitted by the base station.

In a wireless communication system, a base station may make decisions regarding Modulation and Coding Scheme (MCS) selection and mobile station scheduling based on the quality of the data channel between the base station and the mobile station. The mobile station measures information about the channel quality and feeds back this information to the base station as CQI. As discussed above, the channel quality may be measured based on the common pilot signals. CQI feedback may be reported periodically or aperiodically using the Physical Uplink Shared Channel (PUSCH). The CQI reporting mode may be selected by the base station and signalled to the target mobile station through Radio Resource Control (RRC). RRC is a high layer control that may transmit radio system configuration information and may be transmitted less often than data or pilot signals. According to some embodiments, the base station selects aperiodic CQI reporting for a mobile station utilizing transparent relay. Aperiodic CQI reporting may be desirable because a relay station and may transmit aperiodically over the PUSCH to the base station.

Figure 15:
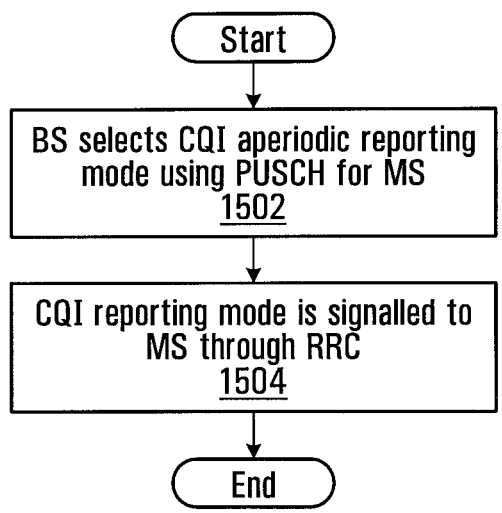
FIG. 15 is a flowchart showing steps for reporting CQI in transparent relay according to some aspects.

FIG. 15 is a flowchart showing steps for reporting CQI in transparent relay according to some aspects. At step 1502, a base station selects a CQI reporting mode for a mobile station, said CQI reporting mode being aperiodic reporting using PUSCH. At step 1504, the CQI reporting mode is signalled to the mobile station through RRC.

What has been described is merely illustrative of the application of the principles of the invention. Other arrangements and methods can be implemented by those skilled in the art without departing from the spirit and scope of the present invention.

The invention claimed is:

1. A relay method in a wireless communication system comprising:
a relay station receiving data, dedicated pilot signals, and common pilot signals from a base station;
the relay station nulling the common pilot signals; and
the relay station transmitting the data and dedicated pilot signals to a mobile station.

2. The method of claim 1, further comprising the base station transmitting the data, the dedicated pilot signals and the common pilot signals to the mobile station, wherein the base station and the relay station transmit the data and dedicated pilot signals over the same channel resources.

3. The method of claim 1, further comprising the mobile station measuring channel quality based on the common pilot signals received from the base station.

4. The method of claim 1, further comprising the mobile station performing channel estimation based on the dedicated pilot signals received from the base station and the relay station, wherein the mobile station only performs channel estimation during subframes which contain the dedicated pilot signals.

5. The method of claim 1, wherein the base station, the mobile station, and the relay station are each configured to operate utilizing a LTE standard.

6. The method of claim 5, further comprising the base station scheduling a LTE transmission mode to the mobile station, the LTE transmission mode utilizing dedicated pilot signals.

7. The method of claim 6, wherein the LTE transmission mode is LTE Transmission Mode 7.

8. The method of claim 5, wherein the relay station and the mobile station transmit the dedicated pilot signals over resource elements that are not occupied by the common pilot signals transmitted by the base station.

9. The method of claim 8, wherein the step of the relay station nulling the common pilot signals further comprises the relay station nulling the resource elements occupied by the common pilot signals transmitted by the base station.

10. The method of claim 1, wherein the relay method is part of a Hybrid Automatic Repeat reQuest (HARM) process.

11. The method of claim 1, wherein the base station and the relay station each pre-code the data and the dedicated pilot signals using a pre-coding matrix.

12. The method of claim 1, wherein: the base station selects a channel quality indicator (CQI) reporting mode for the mobile station, the CQI being based on channel quality measurements; the reporting mode selected by the base station is aperiodic reporting using a physical uplink shared channel; and the reporting mode is signalled to the mobile station through radio resource control.

13. An apparatus in a relay station comprising:
a module for receiving data, dedicated pilot signals, and common pilot signals from a base station;
a module for nulling the common pilot signals; and
a module for transmitting the data and the dedicated pilot signals to a mobile station.

14. The apparatus of claim 13, wherein the relay station is configured to operate utilizing a LTE standard.

15. The apparatus of claim 14, wherein the module for transmitting is configured to transmit to a mobile station which is scheduled to a LTE transmission mode, the LTE transmission mode utilizing the dedicated pilot signals.

16. The apparatus of claim 15, wherein the LTE transmission mode is LTE Transmission Mode 7.

17. The apparatus of claim 14, wherein the module for transmitting is configured to transmit the dedicated pilot signals over resource elements that are not occupied by the common pilot signals transmitted by the base station, and the module for nulling the common pilot signals is configured to null the resource elements occupied by the common pilot signals transmitted by the base station.

18. A wireless relay based communications network comprising: a base station; a relay station; and a mobile station, wherein the relay station receives data, dedicated pilot signals, and common pilot signals from the base station, the relay station nulls the common pilot signals, and the base station and the relay station transmit the data and dedicated pilot signals to the mobile station over the same channel resources.

19. The network of claim 18, wherein the mobile station measures channel quality based on the common pilot signals received from the base station, the mobile station performs channel estimation based on the dedicated pilot signals received from the base station and the relay station, and the mobile station only performs channel estimation during subframes which contain the dedicated pilot signals.

20. The network of claim 19, wherein, the base station, the mobile station, and the relay station are each configured to operate utilizing a LTE standard, and the base station schedules a LTE transmission to the mobile station, the LTE transmission mode utilizing dedicated pilot signals.

* * * * *

UNITED STATES PATENT AND TRADEMARK OFFICE
CERTIFICATE OF CORRECTION

PATENT NO. : 8,737,912 B2
APPLICATION NO. : 13/058708
DATED : May 27, 2014
INVENTOR(S) : Jianglei Ma et al.

Page 1 of 1

It is certified that error appears in the above-identified patent and that said Letters Patent is hereby corrected as shown below:

In the Claims:

Column 16, Line 25, In Claim 10, delete "(HARM)" and insert -- (HARQ) --, therefor.

Signed and Sealed this
Second Day of September, 2014

Michelle K. Lee
*Deputy Director of the United States Patent and Trademark Office*